United States Patent
Hogan et al.

(10) Patent No.: US 11,555,437 B2
(45) Date of Patent: Jan. 17, 2023

(54) EXHAUST PIPE

(71) Applicant: Caterpillar Inc., Peoria, IL (US)

(72) Inventors: Keith Daniel Hogan, St. Pete Beach, FL (US); Yong Yi, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 93 days.

(21) Appl. No.: 17/247,311

(22) Filed: Dec. 7, 2020

(65) Prior Publication Data

US 2022/0178296 A1 Jun. 9, 2022

(51) Int. Cl.
*F01N 13/08* (2010.01)
*F01N 13/18* (2010.01)
*F01N 3/20* (2006.01)

(52) U.S. Cl.
CPC ......... *F01N 13/08* (2013.01); *F01N 13/1805* (2013.01); *F01N 13/1844* (2013.01); *F01N 3/2066* (2013.01); *F01N 2610/1453* (2013.01)

(58) Field of Classification Search
CPC .. F01N 13/08; F01N 13/1805; F01N 13/1844; F01N 3/2066; F01N 2610/1453; F01N 2470/30; F01N 2470/18; F01N 2610/02
USPC .......................................................... 60/295
See application file for complete search history.

(56) References Cited

U.S. PATENT DOCUMENTS

| | | | |
|---|---|---|---|
| 6,513,323 B1 * | 2/2003 | Weigl | B01D 53/9431 137/340 |
| 8,635,861 B2 | 1/2014 | Sun et al. | |
| 8,800,275 B2 | 8/2014 | Crandell et al. | |
| 8,820,059 B1 * | 9/2014 | Fahrenkrug | F01N 3/035 60/303 |
| 8,893,481 B2 * | 11/2014 | Katou | F01N 3/208 60/311 |
| 8,959,900 B2 | 2/2015 | Solbrig et al. | |
| 8,991,160 B2 * | 3/2015 | Katou | B01F 25/435 60/301 |
| 8,999,276 B1 | 4/2015 | Bui | |
| 9,352,276 B2 | 5/2016 | Sampath | |
| 9,528,414 B2 * | 12/2016 | Mitchell | F01N 13/08 |
| 9,598,999 B2 | 3/2017 | De Rudder et al. | |
| 10,329,991 B2 * | 6/2019 | Lehrbaum | F01N 13/141 |
| 10,371,032 B2 * | 8/2019 | Kasai | F01N 13/08 |

(Continued)

OTHER PUBLICATIONS

Written Opinion and International Search Report for Int'l. Patent Appln. No. PCT/US2021/058560, dated Feb. 23, 2022 (11 pgs).

*Primary Examiner* — Anthony Ayala Delgado
(74) *Attorney, Agent, or Firm* — Harrity & Harrity, LLP (57) ABSTRACT

An exhaust pipe includes a first end, a second end, and a wall connecting the first end to the second end. The first end has a first opening, and the second end has a second opening that fluidly communicates with the first opening to define a bore. The wall includes an inner curved second and an outer curved section that includes an indentation. The indentation includes a first inwardly extending part and a second inwardly extending part. The second inwardly extending part includes a through hole having an inner opening and an outer opening. The inner opening is located between the outer opening and the second opening. A diameter of the outer opening is less than a diameter of the inner opening. A thickness of the second inwardly extending part is less than the diameter of the outer opening.

20 Claims, 4 Drawing Sheets

(56) References Cited

U.S. PATENT DOCUMENTS

| | | |
|---|---|---|
| 10,408,110 B2 | 9/2019 | Johnson et al. |
| 2008/0155973 A1* | 7/2008 | Maruyama ............ F01N 3/2066 60/299 |
| 2011/0011060 A1* | 1/2011 | McCarthy, Jr. ....... F01N 3/2033 60/274 |
| 2011/0079003 A1 | 4/2011 | Sun |
| 2013/0164182 A1 | 6/2013 | Iijima |
| 2013/0219871 A1* | 8/2013 | Crandell ................ F01N 3/24 60/295 |
| 2016/0245142 A1 | 8/2016 | Venkataraghavan |
| 2018/0080362 A1* | 3/2018 | Kasai ................... F01N 3/2892 |

* cited by examiner

EXHAUST PIPE

TECHNICAL FIELD

The present disclosure relates generally to a pipe and, for example, to an exhaust pipe for facilitating uniform dispersion of reductant within an exhaust stream.

BACKGROUND

In an exhaust aftertreatment system, a reductant injector introduces a reductant (e.g. a urea solution, an anhydrous ammonia, an aqueous ammonia, and/or the like) into an exhaust conduit, which guides an exhaust stream from an engine to a selective catalytic reduction (SCR) module. Once the exhaust stream enters the SCR module, the reductant selectively reacts with nitrous oxides (NOx) within the exhaust stream to convert the NOx into other compounds that satisfy emissions standards, such as dinitrogen ($N_2$), water ($H_2O$), carbon dioxide ($CO_2$), and/or the like.

However, once the reductant is introduced into the exhaust stream, the reductant tends to settle onto surfaces of the exhaust conduit and, over time, may form crystallized deposits (e.g., urea, biuret, and/or cyanuric acid) that obstruct flow of the exhaust stream and/or damage the system. Additionally, the reductant, as introduced by the reduction injector, tends to non-uniformly mix with the exhaust stream, which may result in undesirable compounds passing through the SCR module. For example, due to the exhaust stream having too little reductant in some portions thereof, the exhaust aftertreatment system may discharge an excess of nitrous oxides and thus fail to satisfy emission standards. As a further example, due to the exhaust stream having an excess of reductant in other portions thereof, the exhaust aftertreatment system may discharge unreacted ammonia ($NH_3$), often referred to as ammonia slip. Furthermore, due to the placement of the reductant injector within the exhaust stream, which may have a temperature in a range of 500 degrees Celsius to 700 degrees Celsius, the reductant injector may be susceptible to overheating.

U.S. Pat. No. 8,800,275, which issued to Crandell et al. on Aug. 12, 2014, discloses an engine exhaust assembly that includes a curved exhaust line having an exhaust flow from an upstream end to a downstream end. An indentation includes an upstream wall extending at least partially into the exhaust line curved portion and disposed in the exhaust flow, and a downstream wall formed integrally with and located downstream of the upstream wall, the downstream wall extending at least partially into the exhaust line curved portion and disposed in the exhaust flow, the downstream wall having an interior surface oriented to substantially face the exhaust line downstream end and an exterior surface facing substantially away from the exhaust line downstream end. A recess is formed integrally with the downstream wall and extends from the downstream wall in a direction away from the exhaust line downstream end, and a recess aperture is formed in the recess. An injector is coupled to the downstream wall exterior surface and has a nozzle aligned with the recess aperture.

The exhaust pipe of the present disclosure solves one or more of the problems set forth above and/or other problems in the art.

SUMMARY

In some implementations, an exhaust pipe includes a first end having a first opening; a second end having a second opening within a plane, wherein the second opening fluidly communicates with the first opening to define a bore for guiding an exhaust stream; and a wall connecting the first end to the second end, wherein the wall includes: an inner portion comprising: a first inner linear section that is adjacent to the first opening, a second inner linear section that is adjacent to the second opening, and an inner curved section connecting the first inner linear section to the second inner linear section, and an outer portion comprising: a first outer linear section that is adjacent to the first opening, a second outer linear section that is adjacent to the second opening, and an outer curved section connecting the first outer linear section to the second outer linear section and including an indentation for supporting a reductant injector, the indentation including: a first inwardly extending part that is substantially perpendicular to the plane, a second inwardly extending part that is substantially parallel to the plane, and a curved part that connects the first inwardly extending part to the second inwardly extending part, wherein a first linear distance between the curved part and the inner curved section is substantially equal to a second linear distance between a first curve end and a second curve end of the inner curved section.

In some implementations, an exhaust pipe includes a first end having a first opening; a second end having a second opening, wherein the second opening fluidly communicates with the first opening to define a bore that is configured to guide an exhaust stream flowing from the first opening through the second opening; and a wall connecting the first end to the second end, wherein the wall includes: an inner portion comprising: a first inner linear section that is adjacent to the first opening, a second inner linear section that is adjacent to the second opening, and an inner curved section extending between the first inner linear section and the second inner linear section, wherein a radius of curvature of the inner curved section increases as the inner curved section extends from the first inner linear section to connect with the second inner linear section, and an outer portion having a surface area that is larger than a surface area of the inner portion, the outer portion comprising: a first outer linear section that is adjacent to the first opening, a second outer linear section that is adjacent to the second opening, and an outer curved section extending between the first outer linear section and the second outer linear section and including an indentation for supporting a reductant injector.

In some implementations, an exhaust pipe includes a first end having a first opening; a second end having a second opening within a plane, wherein the second opening fluidly communicates with the first opening to define a bore; and a wall connecting the first end to the second end, wherein the wall includes: an inner curved section, and an outer curved section that includes an indentation, the indentation comprising: a first inwardly extending part that is substantially perpendicular to the plane, and a second inwardly extending part that is substantially parallel to the plane and includes a through hole having an inner opening and an outer opening, wherein the inner opening is located between the outer opening and the second opening, a diameter of the outer opening is less than a diameter of the inner opening, and a thickness of the second inwardly extending part is less than the diameter of the outer opening.

DETAILED DESCRIPTION

This disclosure relates to an exhaust pipe, which is applicable to any system involved in combining two or more fluids. For example, the system may be a power system, an exhaust aftertreatment system, and/or the like. The system may be implemented in a machine, such as a motor vehicle, a railed vehicle, a watercraft, an aircraft, or another type of machine.

To simplify the explanation below, the same reference numbers may be used to denote like features. The drawings may not be to scale.

Figure 1:
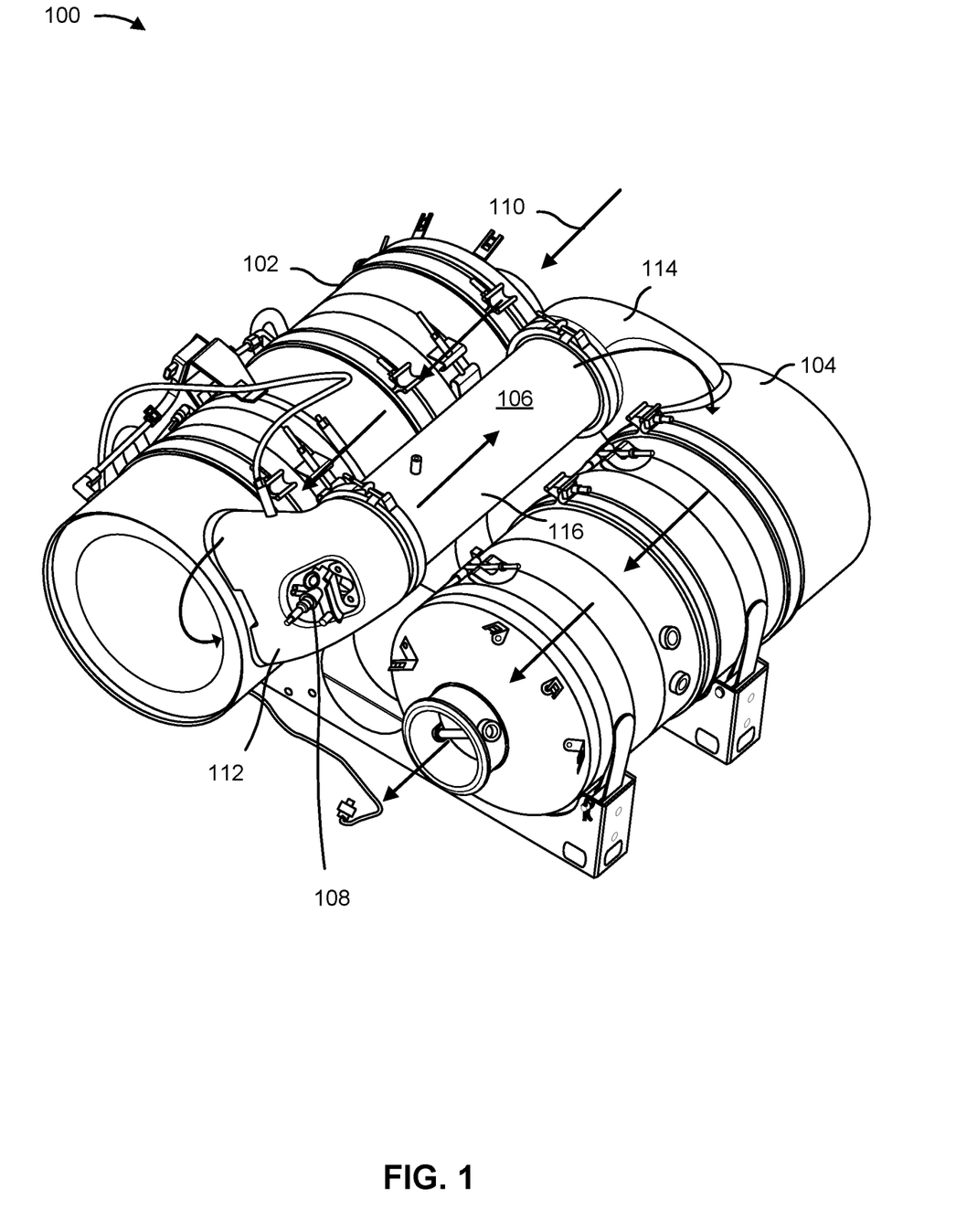
FIG. 1 is an isometric view of an exemplary exhaust aftertreatment system described herein.

FIG. 1 depicts an exemplary exhaust aftertreatment system 100. The exhaust aftertreatment system 100 includes a first filtration canister 102, a second filtration canister 104, an exhaust conduit 106 that connects the first filtration canister 102 to the second filtration canister 104, and a reductant injector mounted to the exhaust conduit 106. The first filtration canister 102 is configured to filter an exhaust stream 110 flowing from an engine (not shown) into the exhaust conduit 106. The exhaust stream 110 may include emission compounds, such as hydrocarbons, particulate matter (e.g., soot and/or ash), and/or nitrous oxides (NOx). To treat the hydrocarbons in the exhaust stream 110, the first filtration canister 102 may include a diesel oxidation catalyst (DOC). The DOC is a flow-through filter that oxidizes the hydrocarbons. Additionally, or alternatively, the first filtration canister 102 may include a diesel particulate filter (DPF) to filter the particulate matter in the exhaust stream 110. The DPF is wall-flow filter that traps the particulate matter therein.

The second filtration canister 104 is configured to filter the exhaust stream 110 flowing from the exhaust conduit 106 into an environment. The second filtration canister 104 includes a selective catalytic reduction (SCR) catalyst that is configured to reduce a concentration of the NOx in the exhaust stream 110. To allow the exhaust stream 110 to pass therethrough, the SCR catalyst may have a honeycomb or otherwise porous structure.

The exhaust conduit 106 is configured to guide the exhaust stream 110 from the first filtration canister 102 into the second filtration canister 104. The exhaust conduit 106 includes a first exhaust pipe 112, which will be described below in connection with FIGS. 2-4, a second exhaust pipe 114, and a third exhaust pipe 116 that connects the first exhaust pipe to the second exhaust pipe 114. While the first exhaust pipe 112, the second exhaust pipe 114, and the third exhaust pipe 116 (collectively referred to herein as the exhaust pipes) are shown as separate components held together via annular clamps, it should be understood that two or more of the exhaust pipes may be integrally formed or attached via a different type of fastener.

Figure 2:
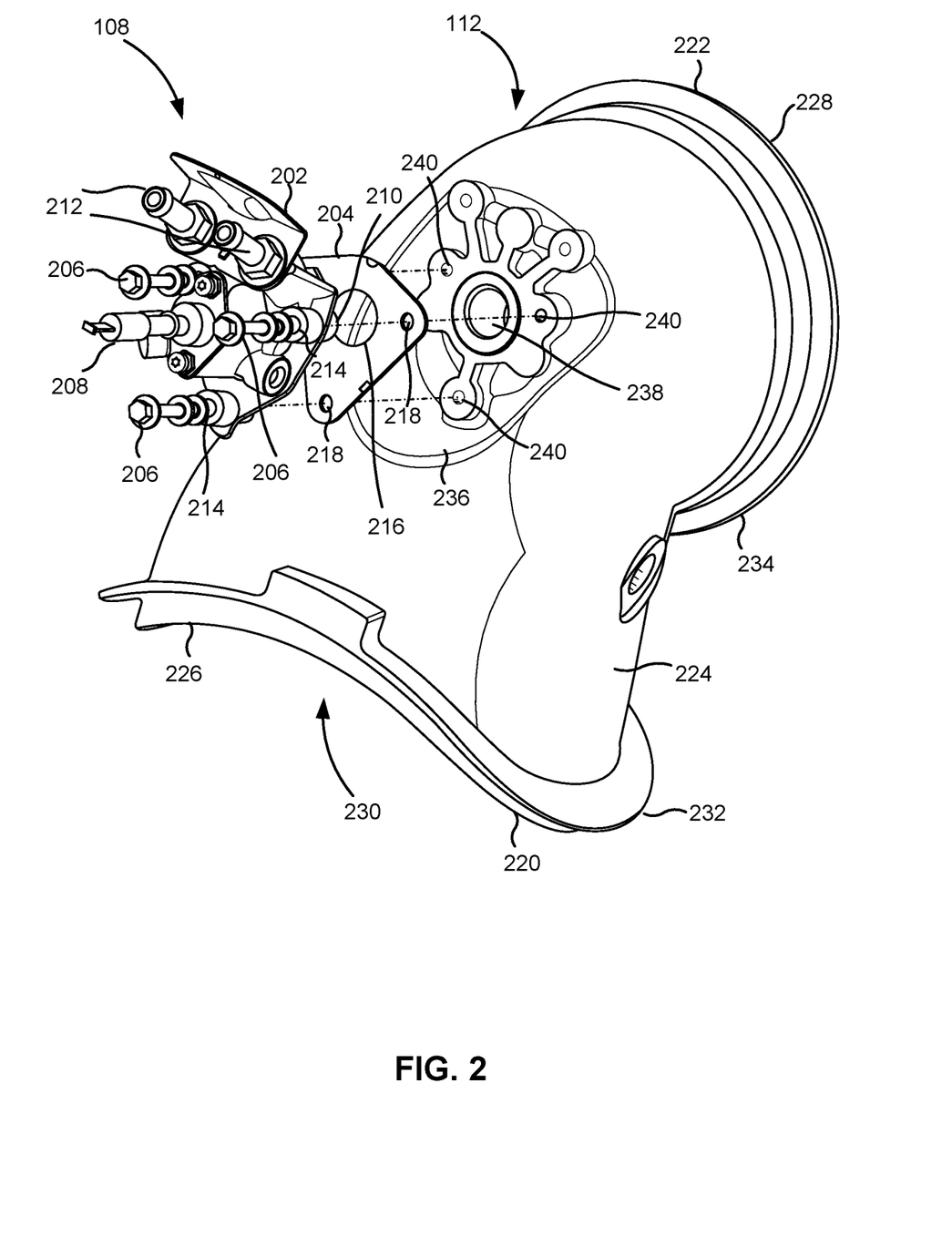
FIG. 2 is an exploded isometric view of a reductant injector and an exhaust pipe of the exhaust aftertreatment system.

The reductant injector 108, which will be described below in connection with FIG. 2, is configured to be mounted to the first exhaust pipe 112 to dispense reductant flowing from a reductant source (not shown) into the exhaust stream 110. The reductant is a fluid that is configured to react with the NOx in the exhaust stream 110 to convert the NOx into other compounds (e.g., dinitrogen ($N_2$), water ($H_2O$), and/or carbon dioxide ($CO_2$)) prior to entering the second filtration canister 104. For example, the reductant may be a urea solution (e.g., diesel exhaust fluid (DEF)), an anhydrous ammonia, and/or an aqueous ammonia.

As indicated above, FIG. 1 is provided as an example. Other examples may differ from what is described with regard to FIG. 1. For example, the number and arrangement of components may differ from that shown in FIG. 1. Thus, there may be additional components, fewer components, different components, differently shaped components, differently sized components, and/or differently arranged components than those shown in FIG. 1.

FIG. 2 depicts the reductant injector 108 and the first exhaust pipe 112 (hereinafter referred to as the exhaust pipe 112). As shown in FIG. 2, the reductant injector 108 includes an injector body 202, a gasket 204, and a plurality of fasteners 206 connecting the injector body 202 and the gasket 204 to the exhaust pipe 112. The injector body 202 includes a reductant port 208, a nozzle 210, a pair of coolant ports 212, and a plurality of apertures 214. The reductant port 208 is configured to receive the reductant from the reductant source and route the reductant through the nozzle 210 into the exhaust pipe 112. The pair of coolant ports 212 are configured to receive coolant (e.g., an inorganic additive technology (IAT) type of coolant, an organic acid technology (OAT) type of coolant, and/or hybrid organic acid technology (HOAT) type of coolant) from a coolant source (not shown). The coolant may be configured to cool components of the exhaust aftertreatment system 100 and/or thaw the reductant. The plurality of apertures 214 are configured to receive the plurality of fasteners 206 to allow the injector body 202 to be fixedly attached to the exhaust pipe 112. The gasket 204 has a central hole 216, to receive the nozzle 210, and a plurality of peripheral holes 218, to receive to the plurality of fasteners 206. The plurality fasteners 206 may include screws, bolts, bushings, washers, and/or a combination thereof.

Figure 3:
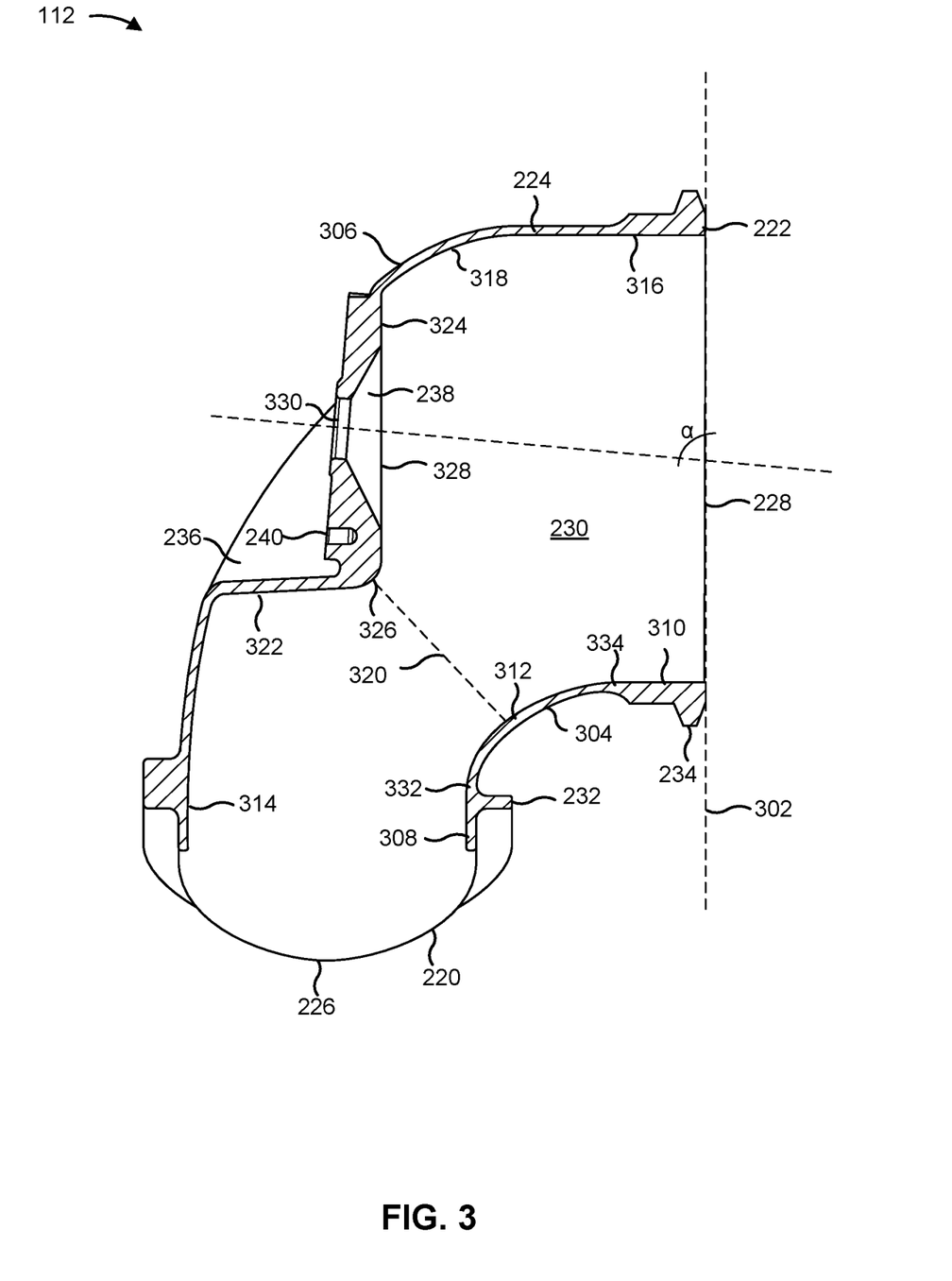
FIG. 3 is a cross-sectional side view of the exhaust pipe.
Figure 4:
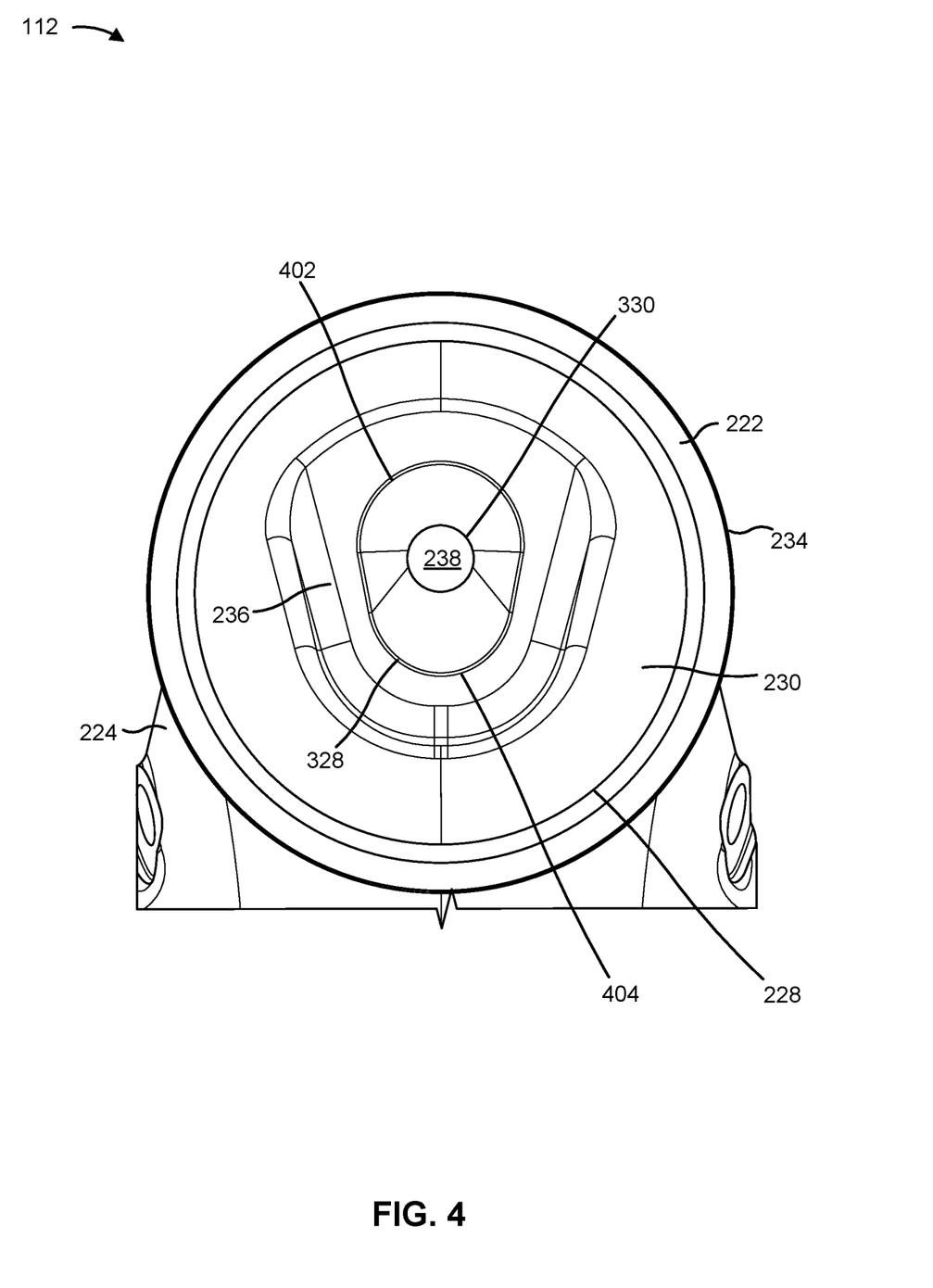
FIG. 4 is a front view of the exhaust pipe.

The exhaust pipe 112, as will be further described below in connection with FIGS. 3-4, is structured and arranged to facilitate uniform dispersion of the reductant into the exhaust stream 110. The exhaust pipe 112 includes a first end 220, a second end 222, and a wall 224 connecting the first end 220 to the second end 222. The first end 220, which may have a radius of curvature that matches a radius of curvature of the first filtration canister 102, includes a first opening 226 to receive the exhaust stream 110 from the first filtration canister 102. The second end 222, which may be planar (e.g., as illustrated by the plane 302 in FIG. 3) to mate with a planar end of the third exhaust pipe 116, includes a second opening 228 that fluidly communicates with the first opening 226 to define a bore 230 for guiding the exhaust stream 110. To facilitate attachment of the exhaust pipe 112 between the first filtration canister 102 and the second filtration canister 104, the wall 224 includes a first flange 232 proximate to the first end 220 and a second flange 234 proximate to the second end 222. To support the reductant injector 108 and allow the reductant to pass therethrough, the wall 224 includes an indentation 236 having a through hole 238 and a plurality of recesses 240. The through hole 238 is configured to receive the nozzle 210, and the plurality of recesses are configured to receive the plurality of fasteners 206. The indentation 236 and the through hole 238, in addition to other interior features of the exhaust pipe 112, will be described in detail below in connection with FIGS. 3-4.

As indicated above, FIG. 2 is provided as an example. Other examples may differ from what is described with regard to FIG. 2. For example, the number and arrangement of components may differ from that shown in FIG. 2. Thus, there may be additional components, fewer components, different components, differently shaped components, differently sized components, and/or differently arranged components than those shown in FIG. 2. For example, to simplify manufacturing and/or assembly, the injector body 202 may be mounted directly to the indentation 236, without the gasket 204 being positioned therebetween.

FIGS. 3-4 depict the exhaust pipe 112. As shown in FIG. 3, the wall includes an inner portion 304 and an outer portion 306 that has a surface area larger than a surface area of the inner portion 304. The inner portion 304 includes a first inner linear section 308, a second inner linear section 310, and an inner curved section 312 connecting the first inner linear section 308 to the second inner linear section 310. The first inner linear section 308 is adjacent to the first opening 226, and the second inner linear section 310 is adjacent to the second opening 228. In order to prevent stagnation within the exhaust stream 110 as the exhaust stream 110 flows along the inner curved section 312, a radius of curvature of the inner curved section 312 increases as the inner curved section 312 extends from the first inner linear section 308 to the second inner linear section 310. In other words, the inner curved section 312 has a flattened curvature that maintains a velocity of the exhaust stream 110 while guiding the exhaust stream 110 to a central region of the exhaust pipe 112.

The outer portion 306 has a first outer linear section 314, a second outer linear section 316, and an outer curved section 318 connecting the first outer linear section 314 to the second outer linear section 316. The first outer linear section 314 is adjacent to the first opening 226, and the second outer linear section 316 is adjacent to the second opening 228. The outer curved section 318 includes the indentation 236, which opposes the inner curved section to form a neck 320 of the exhaust pipe 112. The indentation 236 includes a first inwardly extending part 322, a second inwardly extending part 324, and a curved part 326 that connects the first inwardly extending part 322 to the second inwardly extending part 324. To prevent stagnation within the exhaust stream 110 as the exhaust stream 110 passes along the curved part 326, a radius of curvature of the curved part 326 is less than the radius of curvatures of the inner curved section 312.

The first inwardly extending part 322, which has a thickness that is less than a thickness of the second inwardly extending part, is substantially perpendicular to the plane 302. The second inwardly extending part 324 is substantially parallel to the plane 302. The second inwardly extending part 324 includes the through hole 238, which is eccentric to the second opening 228 and extends at an obtuse angle α relative to the plane 302. The through hole 238 includes an inner opening 328, which has an oblong shape, and an outer opening 330, which has a circular shape. The inner opening 328 is located between the outer opening 330 and the second opening 228. The through hole 238 is shaped and sized to facilitate dispersion of the reductant into the exhaust stream 110. For example, as shown in FIG. 4, the inner opening 328 has an upper portion 402 and a lower portion 404 that is narrower than the upper portion 402. As a further example, a diameter of the inner opening 328 is greater than a diameter of the outer opening 330. The diameter of the outer opening 330 is greater than the thickness of the second inwardly extending part 324.

The exhaust pipe 112 is made of single, integral piece of metal (e.g., stainless steel). For example, the exhaust pipe 112 may be formed by casting. To guide the exhaust stream to the central region within the exhaust pipe 112, a first linear distance between the curved part 326 and the inner curved section 312 is substantially equal to a second linear distance between a first curve end 332 and a second curve end 334 of the inner curved section 312. The first linear distance, which forms the neck 320, is less than a diameter of the first opening 226 and a diameter of the second opening 228. A ratio of the first linear distance to a diameter of the second opening 228 is less than 1:2. A ratio of a length of the first inwardly extending part 322 to the diameter of the second opening 228 is less than 2:5.

As indicated above, FIGS. 3-4 are provided as an example. Other examples may differ from what is described with regard to FIGS. 3-4. For example, the number and arrangement of components may differ from that shown in FIGS. 3-4. Thus, there may be additional components, fewer components, different components, differently shaped components, differently sized components, and/or differently arranged components than those shown in FIGS. 3-4.

INDUSTRIAL APPLICABILITY

The exhaust pipe 112 of the present disclosure is particularly applicable in a system for mixing two or more fluids, such as the exhaust aftertreatment system 100. The exhaust aftertreatment system 100 may be implemented in a machine powered by an internal combustion engine, such as a motor vehicle, a railed vehicle, a watercraft, an aircraft, or another type of machine.

Due to the precise curvatures of the exhaust pipe 112, the exhaust pipe 112 ensures that the exhaust stream 110 flows therethrough along a substantially centered path and with sufficient velocity to uniformly mix the reductant. By eliminating regions of stagnation within the exhaust stream 110, the exhaust pipe 112 inhibits the formation of deposits within the exhaust aftertreatment system 100. As a result, the exhaust pipe 112 is configured to reduce emissions, improve engine performance, and prevent blockages in the flow of the exhaust stream 110, which may damage the exhaust aftertreatment system 100. Furthermore, due to the shape of the through hole 238 and the second inwardly extending part 324, the exhaust pipe 112 is configured to shield the reductant injector 108 against direct impact from the exhaust stream 110. As a result, the exhaust pipe 112 may minimize a potential of the reductant injector 108 overheating.

The foregoing disclosure provides illustration and description, but is not intended to be exhaustive or to limit the implementations to the precise forms disclosed. Modifications and variations may be made in light of the above disclosure or may be acquired from practice of the implementations. Furthermore, any of the implementations described herein may be combined unless the foregoing disclosure expressly provides a reason that one or more implementations cannot be combined. Even though particular combinations of features are recited in the claims and/or disclosed in the specification, these combinations are not intended to limit the disclosure of various implementations. Although each dependent claim listed below may directly depend on only one claim, the disclosure of various implementations includes each dependent claim in combination with every other claim in the claim set.

As used herein, "a," "an," and a "set" are intended to include one or more items, and may be used interchangeably with "one or more." Further, as used herein, the article "the" is intended to include one or more items referenced in connection with the article "the" and may be used interchangeably with "the one or more." Further, as used herein, the terms "comprises," "comprising," "having," "including," or other variations thereof, are intended to cover non-exclusion, such that a process, method, article, or apparatus that comprises a list of elements does not include only those elements, but may include other elements not expressly listed. In addition, in this disclosure, relative terms, such as, for example, "about," "generally," "substantially," and "approximately" are used to indicate a possible variation of ±10% of the stated value, except where otherwise apparent to one of ordinary skill in the art from the context. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "above," "upper," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An exhaust pipe, comprising:
a first end having a first opening;
a second end having a second opening within a plane, wherein the second opening fluidly communicates with the first opening to define a bore for guiding an exhaust stream; and
a wall connecting the first end to the second end, wherein the wall includes:
an inner portion comprising:
a first inner linear section that is adjacent to the first opening,
a second inner linear section that is adjacent to the second opening, and
an inner curved section connecting the first inner linear section to the second inner linear section, and
an outer portion comprising:
a first outer linear section that is adjacent to the first opening,
a second outer linear section that is adjacent to the second opening, and
an outer curved section connecting the first outer linear section to the second outer linear section and including an indentation for supporting a reductant injector, the indentation including:
a first inwardly extending part that is substantially perpendicular to the plane, and
a second inwardly extending part that is substantially parallel to the plane and includes a through hole,
wherein a central axis of the through hole extends at an obtuse angle relative to the plane.

2. The exhaust pipe of claim 1, wherein the indentation further includes a curved part that connects the first inwardly extending part to the second inwardly extending part,
wherein a first linear distance between the curved part and the inner curved section is substantially equal to a second linear distance between a first curve end and a second curve end of the inner curved section, and wherein the first linear distance defines a neck of the exhaust pipe and is less than a diameter of the first opening and a diameter of the second opening.

3. The exhaust pipe of claim 1, wherein the indentation further includes a curved part that connects the first inwardly extending part to the second inwardly extending part,
wherein a first linear distance between the curved part and the inner curved section is substantially equal to a second linear distance between a first curve end and a second curve end of the inner curved section, and
wherein a ratio of the first linear distance to a diameter of the second opening is less than 1:2.

4. The exhaust pipe of claim 1, wherein
the first inwardly extending part has a length; and
a ratio of the length to a diameter of the second opening is less than 2:5.

5. The exhaust pipe of claim 1, wherein a thickness of the first inwardly extending part is less than a thickness of the second inwardly extending part.

6. The exhaust pipe of claim 1, wherein the through hole is at least partially tapered to facilitate dispersion of reductant into the exhaust stream.

7. An exhaust pipe, comprising:
a first end having a first opening;
a second end having a second opening,
wherein the second opening fluidly communicates with the first opening to define a bore that is configured to guide an exhaust stream flowing from the first opening through the second opening; and
a wall connecting the first end to the second end, wherein the wall includes:
an inner portion comprising:
a first inner linear section that is adjacent to the first opening,
a second inner linear section that is adjacent to the second opening, and
an inner curved section extending between the first inner linear section and the second inner linear section,
wherein a radius of curvature of the inner curved section increases as the inner curved section extends from the first inner linear section to connect with the second inner linear section such that the inner curved section has a flattened curvature that is configured to maintain a velocity of the exhaust stream while guiding the exhaust stream to a central region of the exhaust pipe, and
an outer portion having a surface area that is larger than a surface area of the inner portion, the outer portion comprising:
a first outer linear section that is adjacent to the first opening,
a second outer linear section that is adjacent to the second opening, and
an outer curved section extending between the first outer linear section and the second outer linear section and including an indentation for supporting a reductant injector.

8. The exhaust pipe of claim 7, wherein
the second opening is within a plane; and
the indentation includes:
a first inwardly extending part that is substantially perpendicular to the plane, and
a second inwardly extending part that is substantially parallel to the plane.

9. The exhaust pipe of claim 8, wherein
the second inwardly extending part includes a through hole for receiving a nozzle of the reductant injector; and
a thickness of the second inwardly extending part is less than a diameter of the through hole.

10. The exhaust pipe of claim 9, wherein the through hole and the second opening are eccentric.

11. The exhaust pipe of claim 7, wherein the indentation opposes the inner curved section to form a neck of the exhaust pipe that is smaller than the first opening and the second opening.

12. The exhaust pipe of claim 7, further comprising:
a first flange that is proximate to the first end; and
a second flange that is proximate to the second end.

13. The exhaust pipe of claim 7, wherein the exhaust pipe is made of a single, integral piece of metal.

14. An exhaust pipe, comprising:
a first end having a first opening;
a second end having a second opening within a plane, wherein
the second opening fluidly communicates with the first opening to define a bore; and
a wall connecting the first end to the second end, wherein the wall includes:
an inner curved section, and
an outer curved section that includes an indentation, the indentation comprising:
a first inwardly extending part that is substantially perpendicular to the plane, and
a second inwardly extending part that is substantially parallel to the plane and includes a through hole having an inner opening and an outer opening, wherein
the inner opening is located between the outer opening and the second opening,
the inner opening forms an oblong shape that has an upper portion and a lower portion that is narrower than the upper portion, and
a diameter of the outer opening is less than a diameter of the inner opening.

15. The exhaust pipe of claim 14, wherein the first end is non-planar.

16. The exhaust pipe of claim 14, wherein the inner opening has a different shape than the outer opening.

17. The exhaust pipe of claim 14, wherein the indentation further comprises a curved part that connects the first inwardly extending part to the second inwardly extending part and faces the inner curved section.

18. The exhaust pipe of claim 17, wherein a radius of curvature of the curved part is less than a radius of curvature of the inner curved section.

19. The exhaust pipe of claim 14, wherein the through hole extends at an obtuse angle relative to the plane.

20. The exhaust pipe of claim 14, wherein a thickness of the second inwardly extending part is less than the diameter of the outer opening.

* * * * *